US008270337B2

(12) United States Patent
Yu et al.

(10) Patent No.: US 8,270,337 B2
(45) Date of Patent: Sep. 18, 2012

(54) METHOD AND APPARATUS FOR ALLOCATING PEER-TO-PEER RESOURCE IN RELAY-BASED WIRELESS COMMUNICATION SYSTEM

(75) Inventors: Tak-Ki Yu, Yongin-si (KR); Yung-Soo Kim, Seongnam-si (KR); Myeon Kyun Cho, Seongnam-si (KR); Young-Ho Jung, Suwon-si (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 562 days.

(21) Appl. No.: 12/184,878

(22) Filed: Aug. 1, 2008

(65) Prior Publication Data
US 2009/0034447 A1 Feb. 5, 2009

(30) Foreign Application Priority Data
Aug. 3, 2007 (KR) .................................. 2007-78126

(51) Int. Cl.
*H04Q 7/00* (2006.01)
(52) U.S. Cl. ...................... 370/315; 455/452.2; 709/201
(58) Field of Classification Search .................. 370/332; 455/423, 452.2
See application file for complete search history.

(56) References Cited

U.S. PATENT DOCUMENTS

| 6,636,736 | B1* | 10/2003 | Billon ............................ 455/447 |
| 2004/0162871 | A1* | 8/2004 | Pabla et al. .................... 709/201 |
| 2006/0178148 | A1 | 8/2006 | Du et al. |
| 2008/0214182 | A1* | 9/2008 | Wang et al. .................... 455/423 |
| 2008/0227461 | A1* | 9/2008 | Dayal et al. ................. 455/452.2 |
| 2009/0252079 | A1* | 10/2009 | Zhang et al. ................... 370/315 |

OTHER PUBLICATIONS

Shalini Periyalwar et al, "Future mobile broadband wireless networks: a radio resource management perspective", Wirel. Commun. Mob. Comput. 2003: 3:803-816 (DOI: 10.1002/wcm.174).

* cited by examiner

*Primary Examiner* — Yemane Mesfin
*Assistant Examiner* — Wanda Z Russell
(74) *Attorney, Agent, or Firm* — Jefferson IP Law, LLP

(57) ABSTRACT

A method and apparatus for allocating a Peer-to-Peer (P2P) resource in a relay-based wireless communication system are provided. The method includes receiving relay link resource information, determining whether a current link is a multi-hop link by using the relay link resource information, and if the current link is the multi-hop link, allocating a corresponding relay link resource as the P2P resource by determining a serving station. Accordingly, P2P communication can be achieved without having to use additional P2P-dedicated resources.

21 Claims, 9 Drawing Sheets

METHOD AND APPARATUS FOR ALLOCATING PEER-TO-PEER RESOURCE IN RELAY-BASED WIRELESS COMMUNICATION SYSTEM

PRIORITY

This application claims the benefit under 35 U.S.C. §119(a) of a Korean patent application filed in the Korean Intellectual Property Office on Aug. 3, 2007 and assigned Serial No. 2007-78126, the entire disclosure of which is hereby incorporated by reference.

BACKGROUND OF THE INVENTION

1. Field of the Invention

The present invention relates to a method and apparatus for allocating Peer-to-Peer (P2P) resources in a wireless communication system. More particularly, the present invention relates to a method and apparatus for allocating P2P resources without substantial waste in a relay-based wireless communication system.

2. Description of the Related Art

Peer-to-Peer (P2P) communication has recently been introduced as a communications field. A P2P network technique, used in P2P communication, is originated from a file sharing application and is now incorporated into a distribution computing technique, thereby having application in many fields. Accordingly, P2P communication is supported by Mobile Stations (MSs) that use a wireless network (e.g., 802.11(b), (g), Code Division Multiple Access (CDMA), International Mobile Telecommunications (IMT)-2000, etc.) currently available in the P2P network technique. For example, in a wireless communication system, MSs perform P2P communication according to techniques such as Zigbee, WiFi, Bluetooth, etc. However, there is currently no system available for effectively supporting P2P communication in a wireless communication system. In addition, research on P2P communication and research on wireless communication have been conducted independently from each other. Accordingly, if a P2P service is to be supported in a wireless communication system, the P2P communication is achieved with a separate hardware element using a separate air interface by using a separate communication resource, all of which result in ineffective communication. For example, use of a Wireless world Initiative NEw Radio (WINNER) system, which is in a stage of initial research for supporting P2P communication in a wireless communication system, requires a separate resource to be assigned for P2P communication. This may cause a waste of resources.

Today, active research on a Relay Station (RS) is in progress for throughput enhancement and coverage extension in a wireless communication system. Since the WINNER system basically provides cell deployment (including the RS), a system employing the RS must be taken into consideration in a future wireless communication system.

Currently, there is no commercialized system for effectively supporting P2P communication in a wireless communication system. Therefore, a separate communication resource and a separate P2P transmitter/receiver having a separate air interface have been used for P2P communication between MSs in a wireless communication system. However, this is ineffective since the wireless communication system and the P2P system use separately designed air interfaces.

To overcome such disadvantages, a method for effectively supporting P2P communication in a wireless communication system has been developed. For example, in a proposed frame structure, P2P resources are fixedly allocated within communication resources in the WINNER system. However, in this case, even if no MS performs P2P communication, the resources are still fixedly allocated, which causes a waste of resources.

In addition, wireless communication systems now include a multi-path wireless communication system using an RS. Accordingly, there is a need for a method and apparatus for effectively allocating resources without using separate hardware and P2P communication resources in a relay-based communication system.

SUMMARY OF THE INVENTION

An aspect of the present invention is to address at least the above-mentioned problems and/or disadvantages and to provide at least the advantages described below. Accordingly, an aspect of the present invention is to provide a method and apparatus for allocating Peer-to-Peer (P2P) resources in a wireless communication system.

Another aspect of the present invention is to provide a method and apparatus for allocating P2P resources in a relay-based wireless communication system.

Another aspect of the present invention is to provide a method and apparatus for supporting P2P communication without an additional waste of resources in a multi-path wireless communication system.

In accordance with an aspect of the present invention, a method of allocating a P2P resource in a relay-based wireless communication system is provided. The method includes receiving relay link resource information, determining, based on the relay link resource information, whether a current link is a multi-hop link, and if the current link is a multi-hop link, allocating a corresponding relay link resource as a P2P resource by determining a serving station.

In accordance with another aspect of the present invention, an apparatus for allocating a P2P resource in a relay-based wireless communication system is provided. The apparatus includes a P2P controller for receiving relay link resource information and for determining whether a current link is a multi-hop link by using the relay link resource information, and a P2P resource selector for allocating a corresponding relay link resource as the P2P resource by determining a serving station if the current link is the multi-hop link.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. Also, descriptions of well-known functions and constructions will be omitted for clarity and conciseness.

Hereinafter, a method and apparatus for allocating Peer-to-Peer (P2P) resources without substantial waste in a relay-based wireless communication system will be described. Of course, it is to be understood that the following descriptions are merely examples of the invention as defined by the claims and their equivalents.

Figure 1:
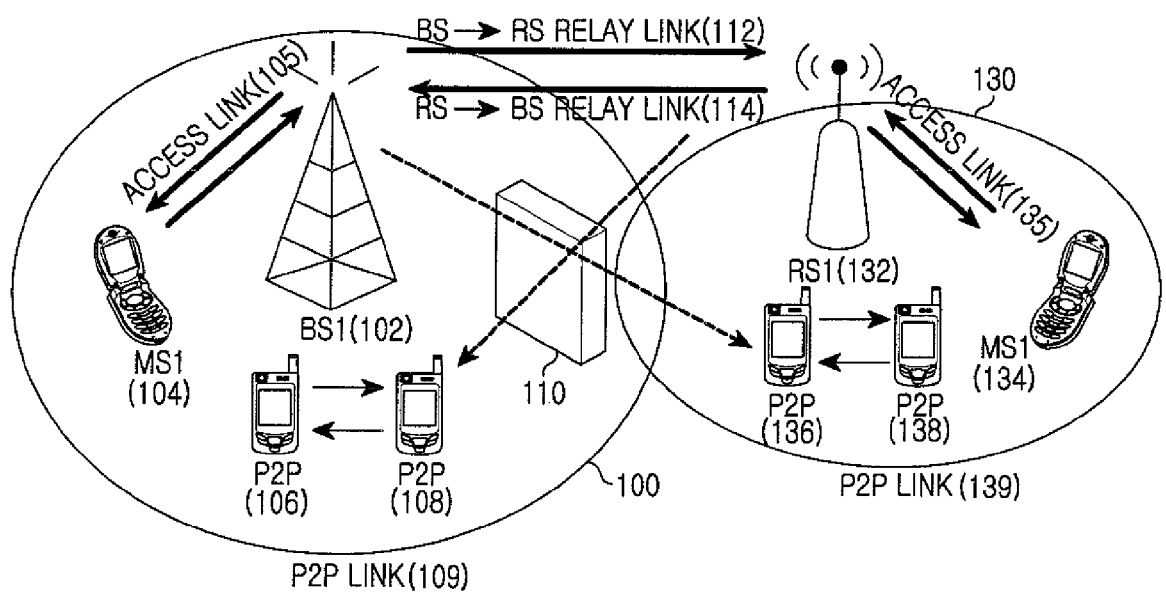
FIG. 1 illustrates an example of a relay-based wireless communication system using a relay link resource and an access link resource for Peer-to-Peer (P2P) communication according to an exemplary embodiment of the present invention.

FIG. 1 illustrates a relay-based wireless communication system using a relay link resource and an access link resource for P2P communication according to an exemplary embodiment of the present invention.

Referring to FIG. 1, in an area 130 separated by a distance from a Base Station (BS) 102, a received signal strength of the BS 102 decreases due to, for example, channel shadowing caused by a building 110. Therefore, Mobile Stations (MSs) in the area 130 may receive services from the BS 102 via a Relay Station (RS) 132. The RS 132 is installed in a location (e.g., a roof of the building 110) where a Line Of Sight (LOS) can be ensured with respect to the BS 102. Thus, MSs 134, 136, and 138 in the area 130 can receive reliable service. Considering such an environment where the RS 132 is installed, the RS 132 receives a signal with a high Signal-to-Interference and Noise Ratio (SINR) from the BS 102. However, the MSs 134, 136, and 138 in the service area 130 of the RS 132 receive a signal with a low SINR from the BS 102. Similarly, the BS 102 receives a signal with a high SINR from the RS 132. However, the MSs 104, 106, and 108 in the service area 100 of the BS 102 receive a signal with a low SINR from the RS 132. In such an environment, interference imposed on the MSs using resources of relay links 112 and 114 may be utilized so that P2P communication can be effectively achieved by sharing the resources without having to use P2P-dedicated resources.

For effective P2P communication, information regarding the resources of the relay links 112 and 114 is added to a frame structure in a unit of several frames or in every frame and is broadcast by the BS 102 or the RS 132. For identification purposes, the BS 102 and the RS 132 use unique identifiable signals (including preambles).

The MSs 104, 106, 108, 134, 136, and 138 determine received signal strengths of the BS 102 and the RS 132 to determine a serving station. The term "serving station" denotes a superordinate network entity that an MS intends to access according to the location of the MS. For example, the serving station of the MSs 104, 106, and 108 is the BS 102, and the serving station of the MSs 134, 136, and 138 is the RS 132. The MSs 104, 106, 108, 134, 136, and 138 can perform P2P communication using the resources of the relay links 112 and 114 according to the determined serving station. Alternatively, P2P links 109 and 139 can be established by allocating uplink resources of access links 105 and 135 and separate P2P-dedicated resources in addition to the resources of the relay links 112 and 114.

When the MSs 104, 106, 108, 134, 136, and 138 determine the received signal strengths of the BS 102 and the RS 132, the following two cases can be taken into consideration. In a first case, the RS 132 is a transparent RS. That is, the BS 102 is located near the RS 132 or no obstacle is present between the BS 102 and the RS 132, thereby ensuring LOS. In this case, the RS 132 does not transmit its own preamble and control information. Since the RS 132 does not transmit its own preamble, other RSs transmit their reference signals according to a preset rule. The rule for transmitting the reference signals is broadcast by the BS 102 in a format of a message (referred to as an RS sounding message in the present invention) and can be decoded by the RSs and the MSs. The reference signal of each RS is transmitted for the purpose of inter-cell channel determination of each RS.

In a second case, the RS 132 is a non-transparent RS. That is, the BS 102 is located far from the RS 132 or an obstacle is present between the BS 102 and the RS 132 and therefore LOS is not ensured. In this case, the RS 132 transmits its own preamble. The preamble for the RS 132 is designed to be distinguished from that of the BS 102. The distinction can be simply made by classifying an entire preamble set into preambles assigned for the BS 102 and preambles assigned for the RS 132.

For each of the MSs 104, 106, 108, 134, 136, and 138 to determine a corresponding serving station by determining the received signal strengths of the BS 102 and the RS 132, the following procedure is performed. In order for an MS to determine its serving station, the received signal strengths of a BS and a non-transparent RS are determined using unique preambles respectively transmitted from the BS and the RS. In case of using a transparent RS, a reference signal transmitted according to a preset rule is used. Thereafter, the strongest signal strength is defined as $P_1$ using the determined signal strength, and a station corresponding to the strongest signal strength is defined as a serving station. A signal strength of a station neighboring the serving station and having the second strongest signal strength is defined as $P_2$. The values $P_1$ and $P_2$ are used in a process of selecting P2P resources.

When P2P communication is performed using the resources of relay links 112 and 114 by determining a serving station of an MS, the following procedure is performed. The MS determines its serving station. According to the determined serving station, the MS selects one of the BS→RS link 112 and the RS→BS link 114. MSs included in the coverage of the BS 102 use the RS→BS link 114 and MSs included in the coverage of the RS 132 use the BS→RS link 112. For example, if P2P communication is performed in an environment where the MSs 106 and 108 are located in a cell area 100 of the BS 102 and are separated by a sufficient distance from the BS 102, the MSs 106 and 108 select the RS→BS link 114 experiencing low interference in P2P communication. Similarly, if P2P communication is performed in an environment where the MSs 136 and 138 are located in the cell area 130 of the RS 132 and are separated by a sufficient distance from the RS 132, the MSs 136 and 138 select the BS→RS link 112 experiencing small interference in P2P communication. When P2P communication is performed, a power level needs to be determined so that the serving station of the MSs is not influenced by interference. Accordingly, the power level is determined using the determined received signal strength of the serving station.

In addition to the resources of the relay links 112 and 114, uplink resources of the access links 105 and 135 can be used together with separate P2P-dedicated resources as P2P resources. In the relay-based wireless communication system, there may be a case where the use of uplink resources of general access links may be advantageous over the use of resources of relay links. This case may change depending on a relay deployment scenario or a geographical factor. In this case, it may be preferable that the uplink resources of the access links of MSs are used in addition to the resources of the relay links. For example, if the MSs 106 and 108 are located near the BS 102 or if the MSs 136 and 138 are located near the RS 132, it may be preferable that separate P2P-dedicated resources are selected to perform P2P communication. In addition, if the MSs 106 and 108 or the MSs 136 and 138 are located between the BS 102 and the RS 132, it may be preferable that the uplink resources of the access links are selected to perform P2P communication. That is, to perform P2P communication, the resources of the relay links may be used only when a specific requirement is satisfied, and otherwise, the uplink resources of the access links may be used. There is a case in which achieving P2P communication is difficult by merely sharing resources of the wireless communication system. For example, when the MSs are located too close to the serving station and thus Transmit (Tx) power is significantly restricted, P2P communication is difficult. In this case, separate P2P-dedicated resources are determined and used together.

Examples of resource allocation for P2P communication in a Time Division Duplex (TDD)-based wireless communication system will now be described with reference to FIGS. 2 to 4. Specifically, two examples are provided. The first is a case where a non-transparent RS exists alone. The second is a case where a transparent RS coexists with the non-transparent RS. In each case, resources of relay links may be used alone, or uplink resources of access links may be used together with reserved resources.

Figure 2:
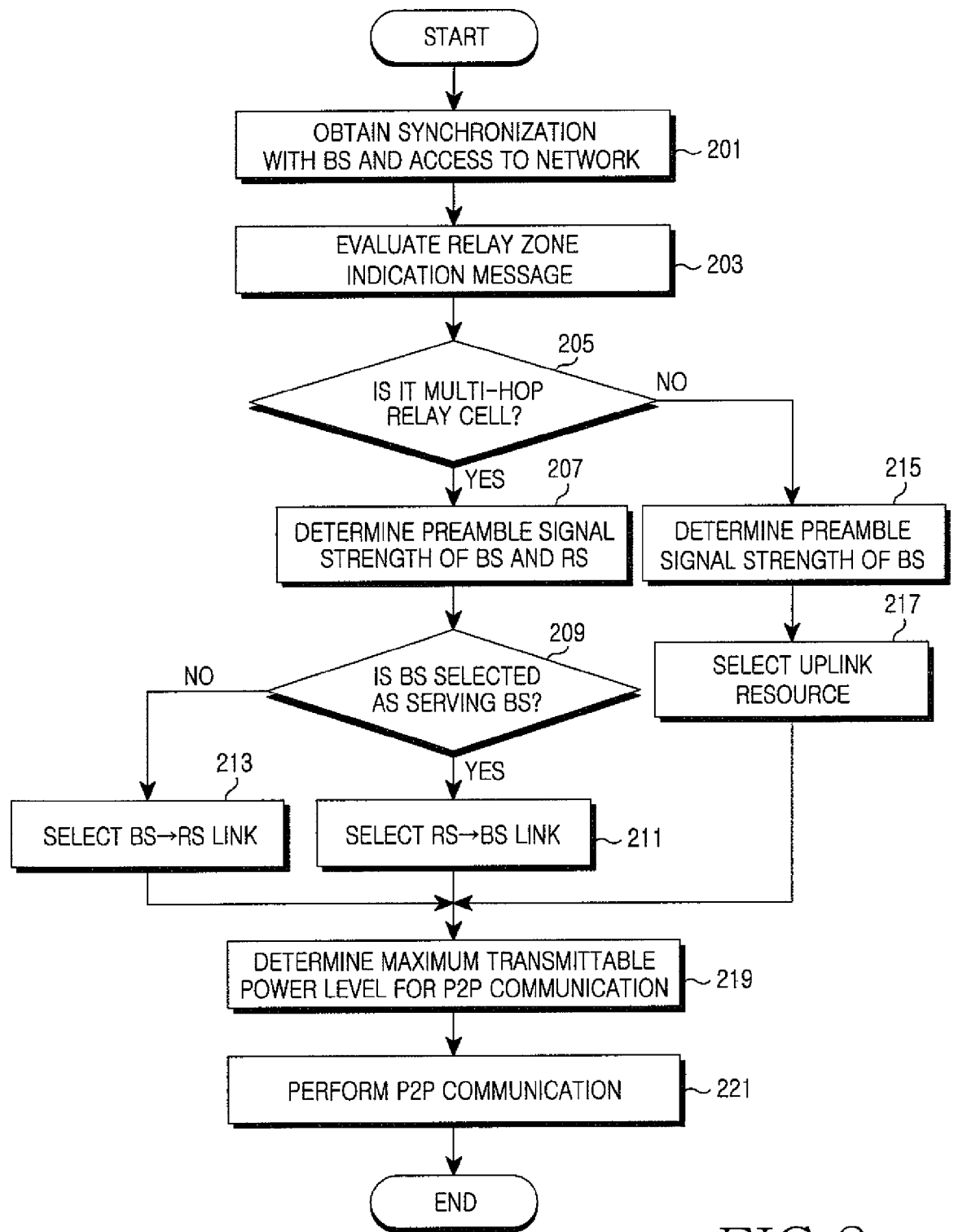
FIG. 2 is a flowchart illustrating an operation of a Mobile Station (MS) that selects a P2P resource in a wireless communication system according to a first exemplary embodiment of the present invention.
Figure 6:
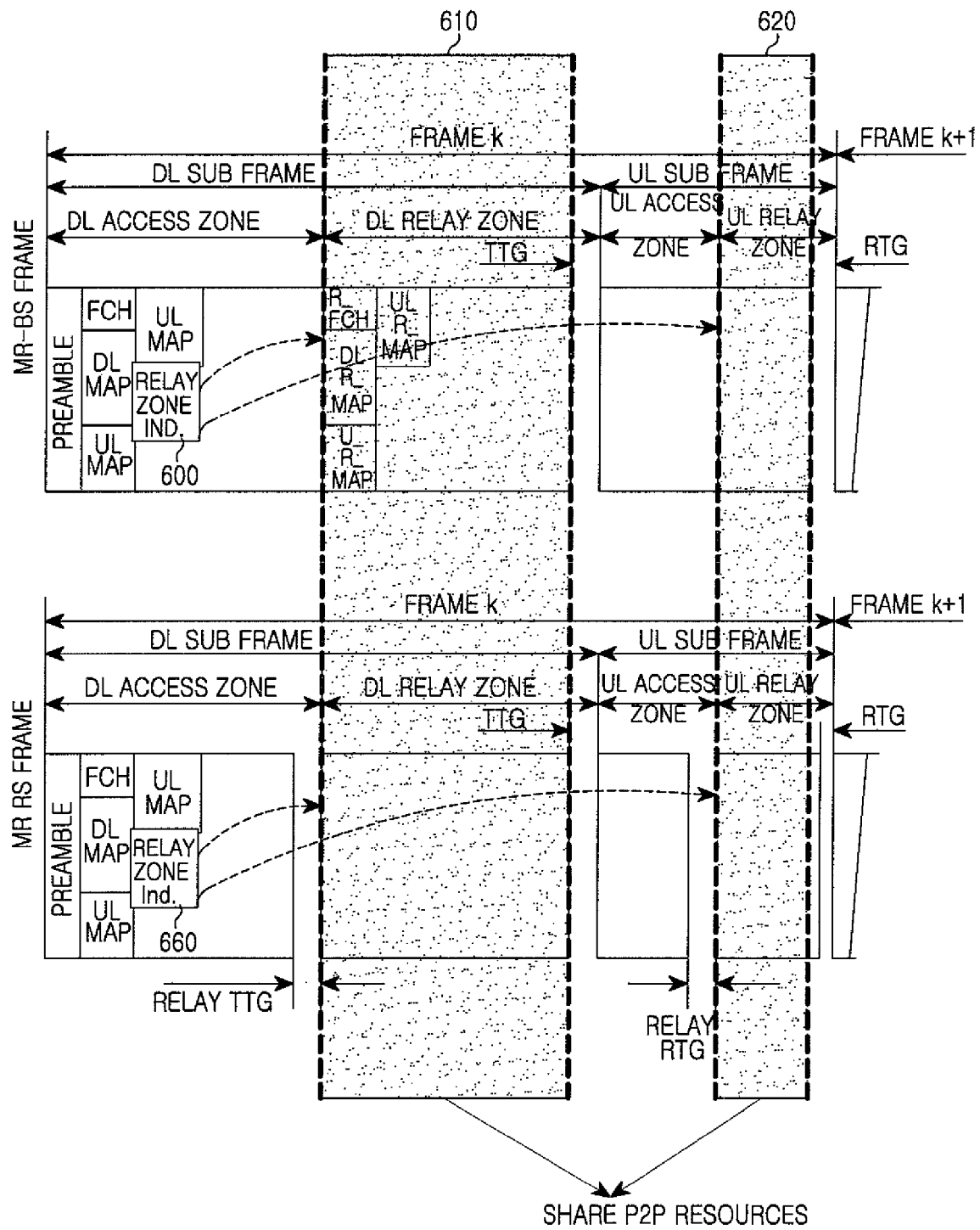
FIG. 6 illustrates a frame structure when a relay link resource is used alone as a P2P resource according to an exemplary embodiment of the present invention.

FIG. 2 is a flowchart illustrating an operation of an MS that selects a P2P resource in a wireless communication system according to a first exemplary embodiment of the present invention. In the operation of FIG. 2, a non-transparent RS exists alone and resources of relay links are used alone. When the non-transparent RS exists alone, all BSs and RSs can transmit unique preambles and can be identified by the preambles. A message for indicating a duration of a relay link resource is transmitted in a header portion of each frame having a structure as illustrated in FIG. 6, which will be described below.

Referring to FIG. 2, in step 201, the MS receives necessary information by broadcast, obtains synchronization with a BS, and decodes basic system information by performing a network access process.

In step 203, the MS evaluates a relay zone indication message which indicates a location of a relay link resource from a header portion of a frame. The relay zone indication message includes not only the location of the relay link resource but also information indicating whether a current link is a multi-hop link or a single-hop link.

In step 205, by using the relay zone indication message, the MS determines whether a cell to which the MS is included is a multi-hop cell or a single-hop cell in which no RS exists. If the cell is determined to be the single-hop cell, the MS proceeds to step 215 and determines a signal strength by receiving a preamble from the BS. In step 217, the MS selects an uplink resource to perform P2P communication.

If the cell is determined to be a multi-hop relay cell in step 205, the MS proceeds to step 207, receives preambles from the BS and the RS and determines respective signal strengths of the BS and the RS. The preambles of the BS and the RS are designed to be identifiable or distinguishable from each other.

In step 209, by using the determined signal strength, the MS determines whether a serving station is the BS. Whether the serving station is the BS or the RS is determined in such a manner that a signal strength of the BS is compared with that of the RS and the station having a greater signal strength is determined to be the serving station. If it is determined that the serving station is the BS, the MS proceeds to step 211 and selects an RS→BS link resource. Otherwise, if it is determined that the serving station is the RS, the MS proceeds to step 213 and selects a BS→RS link resource.

In step 219, the MS determines a maximum transmittable P2P power level using the received preamble strength determined in step 207 for the serving station. In an exemplary implementation, the transmittable P2P power level is inversely proportional to the received preamble strength. That is, the greater the received preamble strength (i.e., the closer to the serving station), the smaller the P2P power level is determined. And conversely, the smaller the received preamble strength (i.e., the farther the distance from the serving station), the higher the P2P power level is determined In step 221, the MS performs P2P communication with the determined power level by using the selected P2P resource.

Thereafter, the procedure of FIG. 2 ends.

Figure 3A:
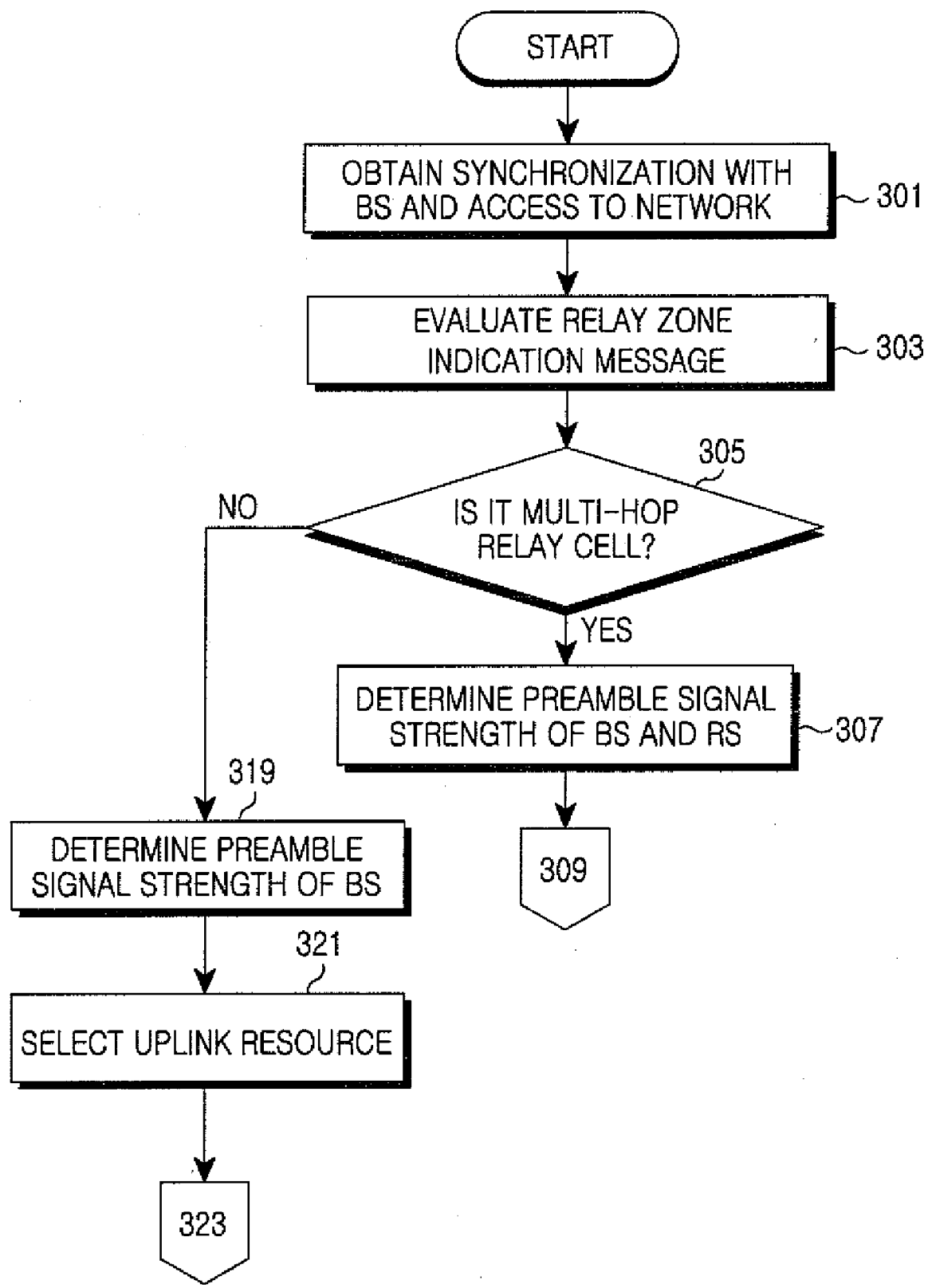
FIGS. 3A and 3B are a flowchart illustrating an operation of an MS that selects a P2P resource in a wireless communication system according to a second exemplary embodiment of the present invention.
Figure 3B:
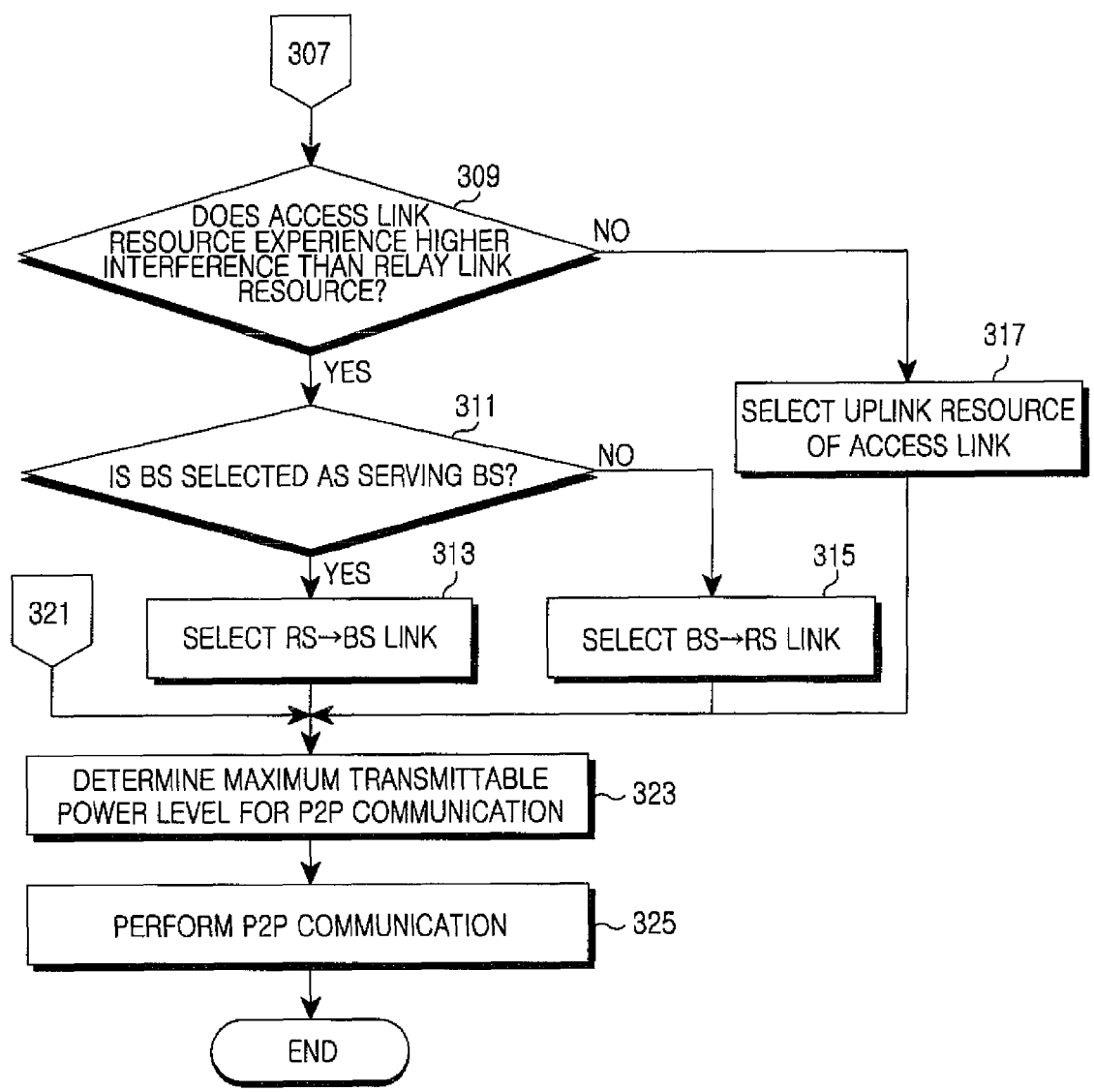
Figure 7:
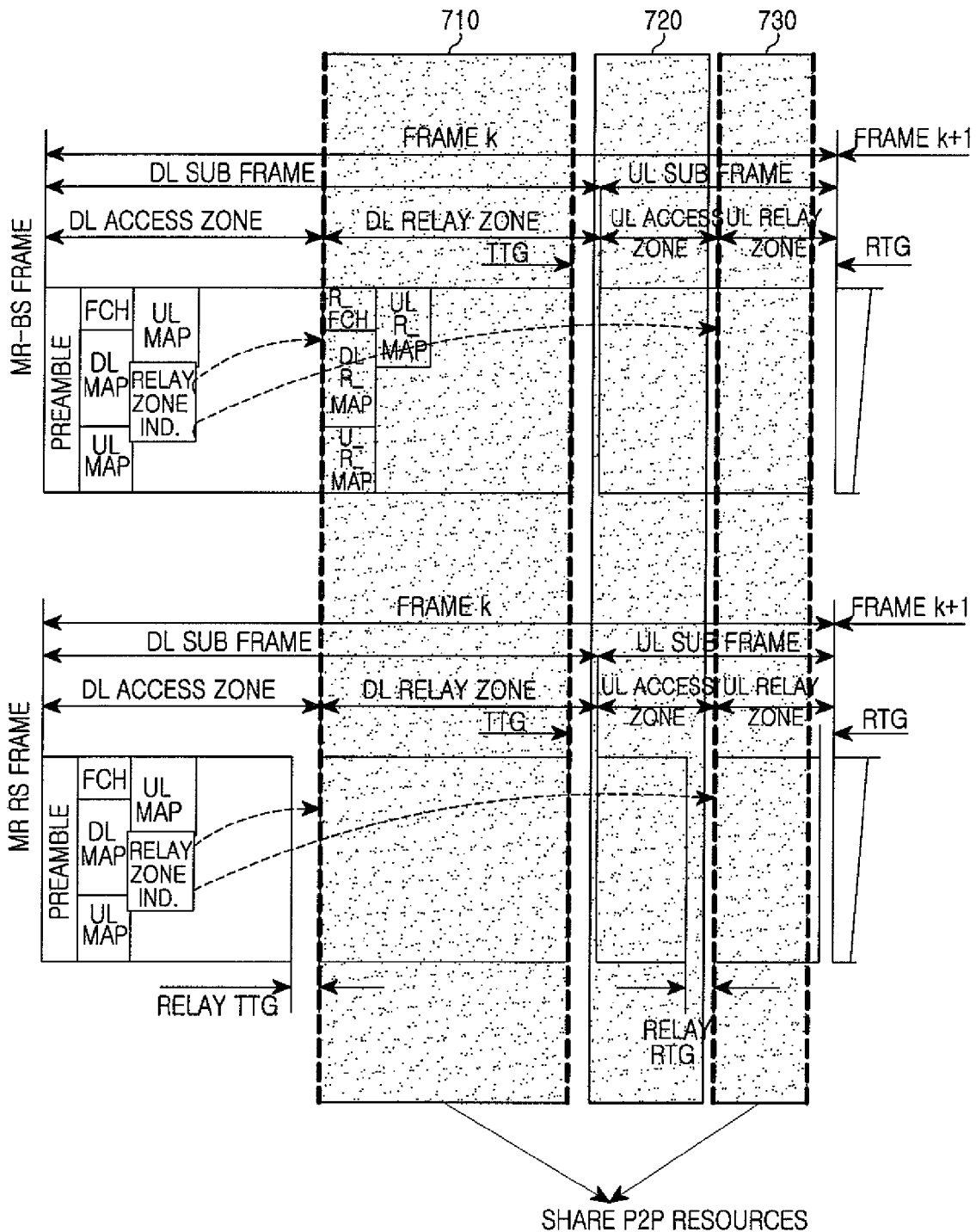
FIG. 7 illustrates a frame structure when a relay link and an access link are used together as a P2P resource according to an exemplary embodiment of the present invention.

FIGS. 3A and 3B are a flowchart illustrating an operation of an MS that selects a P2P resource in a wireless communication system according to a second exemplary embodiment of the present invention. In the operation of FIGS. 3A and 3B, a non-transparent RS exists alone and resources of relay links are used together with uplink resources of access links. When P2P communication is performed using the resources of relay links together with the uplink resources of access links, the frame structure as shown in FIG. 6 is used. Further, additional uplink resources of access links are used as P2P resources as illustrated in FIG. 7, which will be described below.

Referring to FIGS. 3A and 3B, in step 301, the MS receives information by broadcast, obtains synchronization with a BS, and decodes basic system information by performing a network access process.

In step 303, the MS evaluates a relay zone indication message which indicates a location of a relay link resource from a header portion of a frame. The relay zone indication message includes not only the location of the relay link resource but also information indicating whether a current link is a multi-hop link or a single-hop link.

In step 305, by using the relay zone indication message, the MS determines whether a cell to which the MS is included is a multi-hop cell or a single-hop cell in which no RS exists. If the cell is determined to be a single-hop cell, the MS proceeds to step 319 and determines a signal strength by receiving a preamble from the BS. In step 321, the MS selects an uplink resource to perform P2P communication.

If the cell is determined to be a multi-hop relay cell in step 305, the MS proceeds to step 307, receives preambles from the BS and the RS and determines respective signal strengths of the BS and the RS. The preambles of the BS and the RS are designed to be identifiable or distinguishable from each other. The strongest received signal strength is defined as $P_1$ and the second strongest received signal strength is defined as $P_2$.

In step 309, the MS determines a link resource, which experiences high interference and belongs to an access link rather than a relay link, based on the received signal strength. The determination can be made by comparing a threshold with a function value $f(P_1, P_2)$ of signal strengths $P_1$ and $P_2$. The function value $f(P_1, P_2)$ can be set to $P_1/P_2$, that is, a ratio of the two signal strengths. This is because, when the MS exists between the BS and the RS, the use of the uplink resource of the access link may be advantageous over the use of the relay link resource.

In this case, if the link resource experiencing high interference is the relay link resource, that is, if the function value of $f(P_1, P_2)$ is less than the threshold, the MS selects the uplink resource of the access link in step 317.

If the link resource experiencing high interference is the access resource, that is, if the function value of $f(P_1, P_2)$ is greater than the threshold in step 309, based on the signal strength, the MS determines whether a serving station is the BS in step 311. Whether the serving station is the BS or the RS is determined in such a manner that a signal strength of the BS is compared with that of the RS and one station having a greater signal strength is determined to be the serving station. If it is determined that the serving station is the BS, the MS proceeds to step 313 and selects an RS→BS link resource. Otherwise, if it is determined that the serving station is the RS, the MS proceeds to step 315 and selects a BS→RS link resource.

In step 323, the MS determines a maximum transmittable P2P power level by using the received preamble strength determined in step 307 for the serving station. In an exemplary implementation, the transmittable P2P power level is inversely proportional to the received preamble strength. That is, the greater the received preamble strength (i.e., the closer to the serving station), the smaller the P2P power level is determined. And conversely, the smaller the received preamble strength (i.e., the farther the distance from the serving station), the higher the P2P power level is determined In step 325, the MS performs P2P communication with the determined power level by using the selected P2P resource.

Thereafter, the procedure of FIG. 3 ends.

Figure 4A:
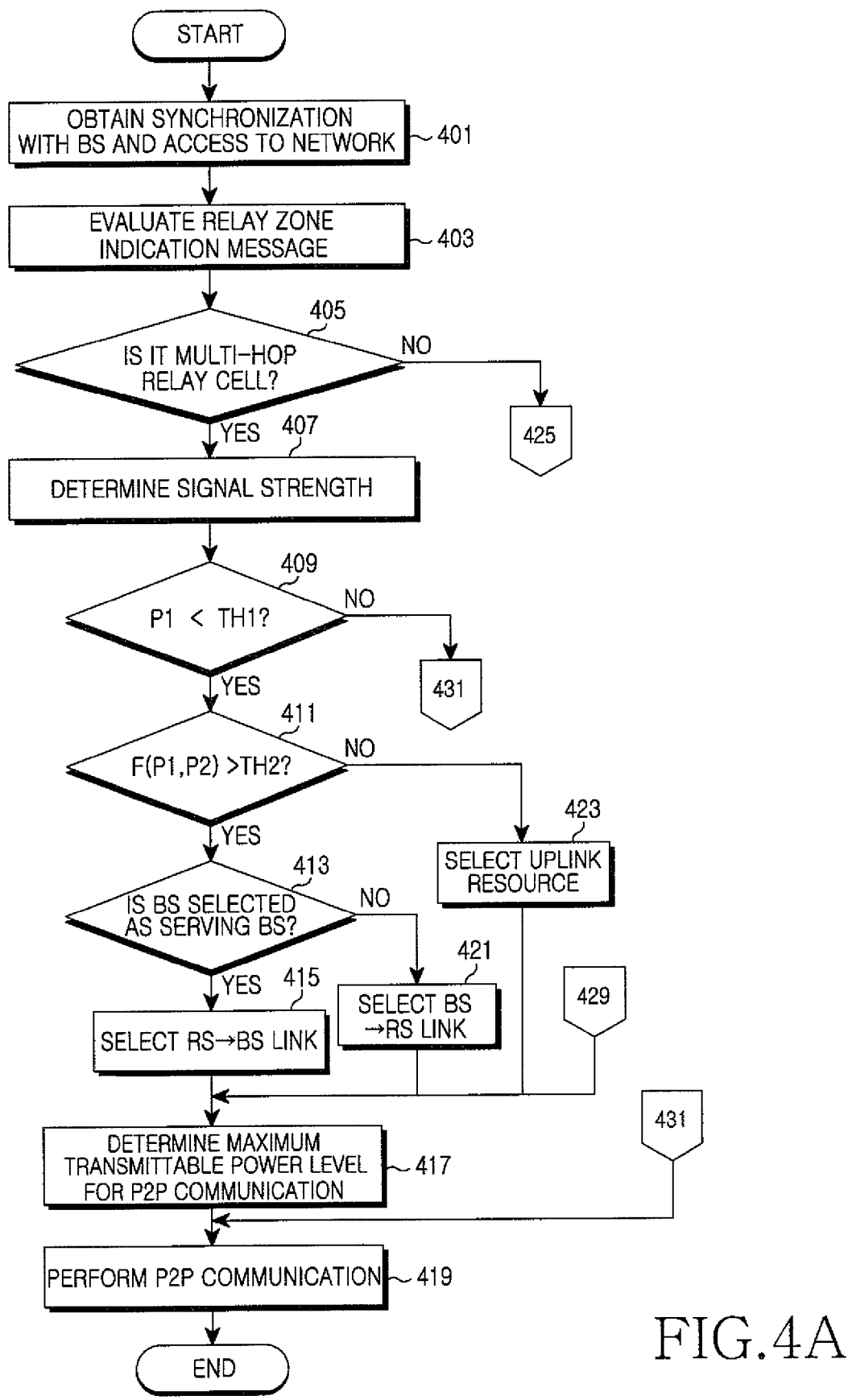
FIGS. 4A and 4B are a flowchart illustrating an operation of an MS that selects a P2P resource in a wireless communication system according to a third exemplary embodiment of the present invention.
Figure 4B:
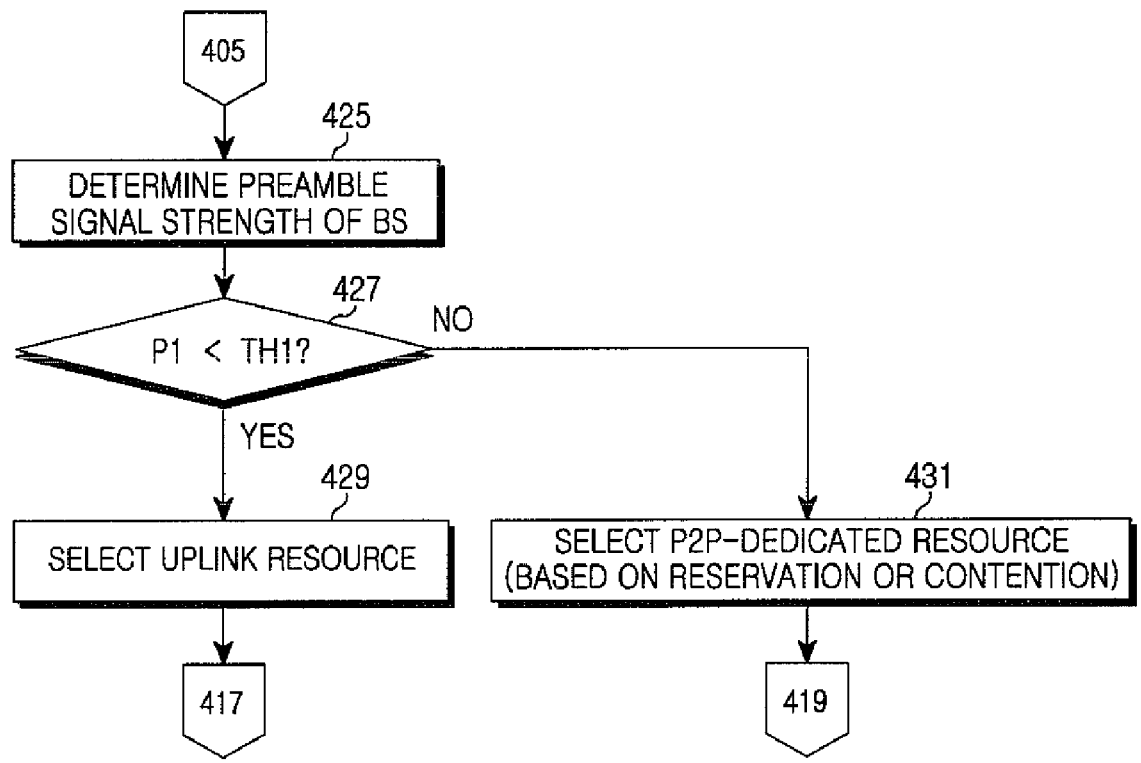

FIGS. 4A and 4B are a flowchart illustrating an operation of an MS that selects a P2P resource in a wireless communication system according to a third exemplary embodiment of the present invention. In the operation of FIG. 4, a P2P-dedicated resource is used together with a relay link resource and an uplink resource of an access link. This operation can be performed when achieving P2P communication is difficult by merely sharing resources of the wireless communication system. For example, when an MS which intends to perform P2P communication is located very close to a BS or an RS, if the P2P communication is achieved by sharing resources, interference with the BS or the RS may be significant. Therefore, maximum Tx power for P2P communication is significantly restricted. To address this problem, some of the resources of the wireless communication system are allocated as P2P-dedicated resources.

Referring to FIGS. 4A and 4B, the MS receives information by broadcast, obtains synchronization with the BS, and decodes basic system information by performing a network access process in step 401.

In step 403, the MS evaluates a relay zone indication message which indicates a location of a relay link resource from a header portion of a frame. The relay zone indication message includes not only the location of the relay link resource but also information indicating whether a current link is a multi-hop link or a single-hop link.

In step 405, by using the relay zone indication message, the MS determines whether a cell to which the MS is included is a multi-hop cell or a single-hop cell in which no RS exists. If the cell is determined to be a single-hop cell, the MS proceeds to step 425 and determines a signal strength by receiving a preamble from the BS. In step 427, the MS compares a preamble signal strength $P_1$ of the serving station with a threshold. If the preamble signal strength $P_1$ is less than the threshold, the MS selects an uplink resource in step 429 in order to perform P2P communication. Otherwise, if the preamble signal strength $P_1$ is greater than the threshold, the MS selects a P2P-dedicated resource in step 431 in order to perform P2P communication. In this case, the P2P-dedicated resource is allocated based on reservation or contention.

If the cell is determined to be the multi-hop relay cell in step 405, the MS proceeds to step 407 and determines respective signal strengths of the BS and the RS. Herein, if the non-transparent RS exists alone, the MS receives preambles from the BS and the RS and determines respective signal strengths of the BS and the RS. The preambles of the BS and the RS are designed to be identifiable or distinguishable from each other. However, if the non-transparent RS co-exists with a transparent RS, an additional RS sounding message is received to determine a received signal strength of the transparent RS. Then, the MS determines reference signal strengths of the BS and the RS. In this case, if it takes a long time to determine signal strengths of all RSs due to a long RS sounding duration, an uplink resource of an access link may be used with priority and then a relay link resource may be selectively used after determining signal strengths as shown in FIGS. 3A and 3B.

In step 409, the MS compares the preamble signal strength $P_1$ with the threshold. If the preamble signal strength $P_1$ is less than the threshold, the MS proceeds to step 411 and determines a link resource, which experiences high interference and belongs to an access link rather than a relay link, based on the received signal strength. The determination can be made by comparing a threshold with a function value $f(P_1, P_2)$ of signal strengths $P_1$ and $P_2$. For example, the function value $f(P_1, P_2)$ can be set to $P_1/P_2$, that is, a ratio of the two signal strengths. This is because, when the MS exists between the BS and the RS, the use of the uplink resource of the access link may be advantageous over the use of the relay link resource.

Otherwise, if the preamble signal strength $P_1$ is greater than the threshold in step 409, the MS selects a P2P-dedicated resource in step 431 in order to perform P2P communication. In this case, the P2P-dedicated resource is allocated based on reservation or contention.

In this case, if the link resource experiencing high interference is the relay link resource, that is, if the function value of $f(P_1, P_2)$ is greater than the threshold, the MS selects the uplink resource of the access link in step 423.

If the link resource experiencing high interference is the access resource, that is, if the function value of f(P$_1$, P$_2$) is less than the threshold in step 411, based on the signal strength, the MS determines whether a serving station is the BS in step 413. Whether the serving station is the BS or the RS is determined in such a manner that a signal strength of the BS is compared with that of the RS and the station having a greater signal strength is determined to be the serving station. If it is determined that the serving station is the BS, the MS proceeds to step 415 and selects an RS→BS link resource. Otherwise, if it is determined that the serving station is the RS, the MS proceeds to step 421 and MS selects a BS→RS link resource.

In step 417, the MS determines a maximum transmittable P2P power level by using the received signal strength determined in step 407 for the serving station.

In step 419, the MS performs P2P communication with the determined power level by using the selected P2P resource.

Thereafter, the procedure of FIG. 4 ends.

Figure 5:
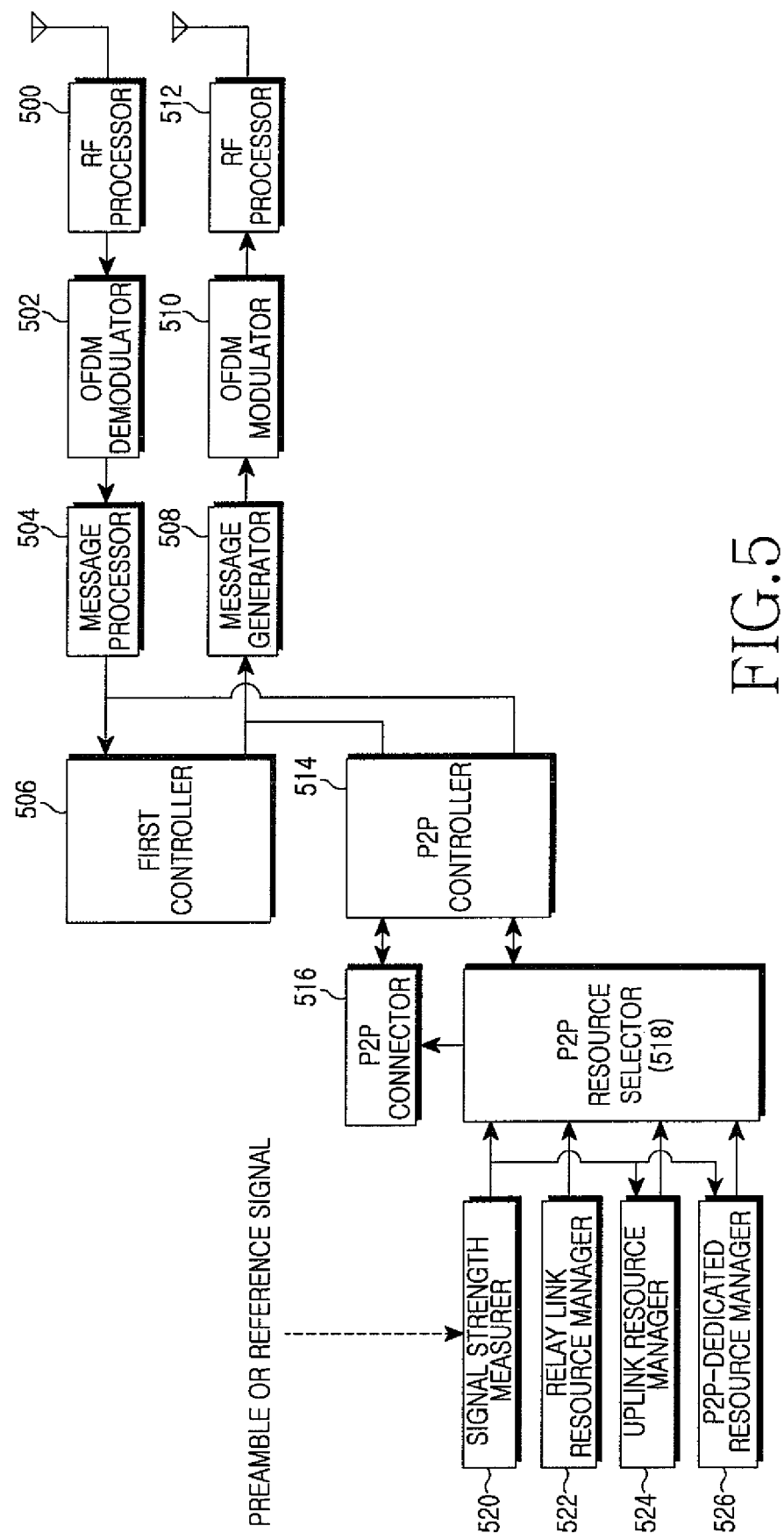
FIG. 5 is a block diagram of an MS that selects a P2P resource in a wireless communication system according to an exemplary embodiment of the present invention.

FIG. 5 is a block diagram of an MS that selects a P2P resource in a wireless communication system according to an exemplary embodiment of the present invention.

Referring to FIG. 5, the MS includes a Radio Frequency (RF) processor 500, an Orthogonal Frequency Division Multiplexing (OFDM) demodulator 502, a message processor 504, a first controller 506, a message generator 508, an OFDM modulator 510, an RF processor 512, a P2P controller 514, a P2P connector 516, a P2P resource selector 518, a signal strength measurer 520, a relay link resource manager 522, an uplink resource manager 524, and a P2P-dedicated resource manager 526.

The RF processor 500 converts an RF signal received through an antenna into a baseband analog signal. The OFDM demodulator 502 converts the analog signal received from the RF processor 500 into sample data. Further, the OFDM demodulator 502 converts the sample data into frequency-domain data through a Fast Fourier Transform (FFT), and selects data of subcarriers to be received from the frequency-domain data. In an exemplary implementation, the OFDM demodulator 502 demodulates and decodes data according to a preset Modulation and Coding Scheme (MCS) level and outputs the data to the message processor 504.

The message processor 504 decomposes a control message received from the OFDM demodulator 502 and provides the decomposition result to the first controller 506. Further, when being switched into a P2P communication mode, the message processor 504 decomposes a P2P control message received from the OFDM demodulator 502 and provides the decomposition result to the P2P controller 514. For example, the message processor 504 decomposes a relay zone indication message that is broadcast from a BS or an RS and provides the decomposition result to the P2P controller 514.

The first controller 506 performs a process corresponding to information received from the message processor 504 and provides the result to the message generator 508. When being switched into the P2P communication mode, the P2P controller 514 performs a process suitable for P2P communication control information received from the message processor 504 and provides the result to the message generator 508.

The message generator 508 generates a message using a variety of information received from the first controller 506 or the P2P controller 514 and outputs the generated message to the OFDM modulator 510 of a physical layer. The OFDM modulator 510 codes and modulates data received from the message generator 508 according to the preset MCS level. Further, the OFDM modulator 510 converts the modulated data into sample data (i.e., an OFDM symbol) through an Inverse Fast Fourier Transform (IFFT). Furthermore, the OFDM modulator 510 converts the sample data into an analog signal and outputs the analog signal to the RF processor 512. The RF processor 512 converts the analog signal into an RF signal and transmits the RF signal through an antenna.

The first controller 506 may receive information, which is required when a general wireless communication protocol is processed through a mobile switching station or the BS, from an element of the physical layer or may generate a control signal to be delivered to the element of the physical layer. The first controller 506 can control and use a transmitter and a receiver in a Time Division Duplex (TDD) or Frequency Division Duplex (FDD) mode.

The P2P controller 514 may receive information, which is required when a P2P communication protocol is processed between MSs, from an element of the physical layer or may generate a control signal to be delivered to the element of the physical layer. The P2P controller 514 can also be used based on the TDD or FDD mode.

More specifically, when a P2P resource is allocated, the P2P resource selector 518 determines whether to use an uplink resource of an access link, or a relay link resource, or an additional P2P-dedicated resource as a P2P resource, and then assigns the determined P2P resource to the P2P connector 516. For example, if Tx power is significantly restricted because the MS is located too close to the serving station (the BS or the RS), the additional P2P-dedicated resource is selected. If the MS is located between the BS and the RS and is separated by a predetermined distance from the BS, the uplink resource of the access link is selected. The MS selects the relay link resource only when the serving station satisfies a specific requirement.

By using relay zone indication information of the BS, the relay link resource manager 522 determines to use an RS→BS link resource in case of a multi-hop cell, and determines to use a BS→RS link resource in case of a single-hop cell, and then reports the determined link resource to the P2P resource selector 518. The uplink resource manager 524 determines whether the MS is located between the BS and the RS or is located within a preset distance from the BS by using the signal strength determined by the signal strength measurer 520, and then reports the determination result to the P2P resource selector 518. For example, a function value f(P$_1$, P$_2$) can be used to determine a preferable resource to be used between the uplink resource of the access link and the relay link resource when the MS is located between the BS and the RS. The function value f(P$_1$, P$_2$) is set to P$_1$/P$_2$, that is, a ratio of the two signal strengths. A signal strength P$_1$ is compared with a threshold to determine whether the MS is located within a preset distance from the BS. The P2P-dedicated resource manager 526 determines whether the MS is located near the BS by using the signal strength determined by the signal strength measurer 520 and then reports the determination result to the P2P resource selector 518.

The signal strength measurer 520 determines signal strengths by using preambles respectively received from the BS and the RS and provides the determined signal strengths to the uplink resource manager 524, the P2P-dedicated resource manager 526, and the P2P resource selector 518. In an exemplary implementation, the signal strength measurer 520 can determine signal strengths by using a reference signal instead of the preambles.

The P2P connector 516 establishes a P2P connection with the MS according to a preset P2P connection process by using a P2P resource selected by the P2P resource selector 518. The P2P connection process is not important in the present invention, and thus detailed descriptions thereof will be omitted.

In the aforementioned structure, the first controller 506 is provided as a protocol controller and controls the message processor 504, the message generator 508, the P2P controller 514, the P2P connector 516, the P2P resource selector 518, the signal strength measurer 520, the relay link resource manager 522, the uplink resource manager 524, and the P2P-dedicated resource manager 526. That is, the first controller 506 can function as the message processor 504, the message generator 508, the P2P controller 514, the P2P connector 516, the P2P resource selector 518, the signal strength measurer 520, the relay link resource manager 522, the uplink resource manager 524, and the P2P-dedicated resource manager 526. Although these elements are separately configured in the present invention, this separate configuration is for explanation purposes only. Thus, in practice, all or some of these elements may be controlled by the first controller 506.

FIG. 6 illustrates a frame structure when a relay link resource is used alone as a P2P resource according to an exemplary embodiment of the present invention.

Referring to FIG. 6, uplink and downlink of a TDD system are identified according to a transmission time. In the frame structure, the relay link resource is also divided into an uplink 620 and a downlink 610. An MS obtains synchronization with a BS by using a preamble. Then, the MS reads a Frame Control Header (FCH) and receives DL-MAP information and UpLink (UL)-MAP information. By using the received DL-MAP information, the MS finds DL/UL burst information and control information, and then performs a desired operation in a corresponding frame. According to exemplary embodiments of the present invention, relay zone indications 660 and 600 are defined, and information on the relay links 610 and 620 are reported to the MS. As a guard time for identifying an uplink/downlink transmission time, a Transmit/receive Transition Gap (TTG) and a Receive/transmit Transition Gap (RTG) are inserted between the downlink 610 and the uplink 620 in a middle portion and a last portion of the frame.

FIG. 7 illustrates a frame structure when a relay link and an access link are used together as a P2P resource according to an exemplary embodiment of the present invention.

The frame structure of FIG. 7 is the same as the frame structure of FIG. 6, and thus detailed descriptions thereof will be omitted. An uplink access resource 720 can be used for P2P communication when the use of an uplink resource of the access link is advantageous over the use of relay link resources 710 and 730.

According to exemplary embodiments of the present invention, relay link resources are shared for P2P communication in a relay-based wireless communication system. Therefore, P2P communication can be achieved without having to use additional P2P-dedicated resources. In addition, P2P communication is performed by effectively selecting one of a relay link resource, an access link resource, and a P2P-dedicated resource according to a situation, thereby providing reliable P2P services.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of allocating a Peer-to-Peer (P2P) resource in a relay-based wireless communication system, the method comprising:
    receiving relay link resource information;
    determining, based on the relay link resource information, whether a current link is a multi-hop link;
    if the current link is a multi hop link, interference generated by the serving station is less than a threshold, a first interference of a relay link is less than a second interference of an access link, and the serving station comprises a Base Station (BS), reallocating a Relay Station (RS)-BS link resource;
    if the current link is a multi-hop hop link, interference generated by the serving station is less than a threshold, a first interference of a relay link is less than a second interference of an access link, and the serving station comprises an RS, reallocating a BS-RS link resource;
    determining a maximum transmittable power level for P2P communication; and
    performing P2P communication using the allocated resource.

2. The method of claim 1, further comprising:
    if the current link is a multi-hop link, interference generated by the serving station is less than a threshold, and a first interference of a relay link is greater than a second interference of an access link,
    allocating an uplink resource as the P2P resource.

3. The method of claim 1, wherein the serving station comprises at least one of a BS and an RS, and further wherein the determining of the serving station comprises determining a received signal strength.

4. The method of claim 1, wherein the relay link resource information comprises at least one of a relay link resource location and an indicator indicating whether the current link is a multi-hop link.

5. The method of claim 1, wherein the determining of the serving station comprises measuring received signal strengths of an RS and a BS.

6. The method of claim 5, wherein the received signal strengths of the RS and the BS are determined by measuring a signal strength of a unique signal respectively corresponding to the RS and the BS.

7. The method of claim 6, wherein the unique signal comprises at least one of a preamble signal, a sounding signal and a reference signal of the RS.

8. An apparatus for allocating a Peer-to-Peer (P2P) resource in a relay-based wireless communication system, the apparatus comprising:
    a P2P controller for receiving relay link resource information; and
    a P2P resource selector for determining, based on the relay link resource information, whether a current link is a multi-hop link, for, if the current link is a multi-hop link, interference generated by the serving station is less than a threshold, a first interference of a relay link is less than a second interference of an access link, and the serving station comprises a Base Station (BS), reallocating a Relay Station (RS)-Base Station BS link resource, for, if the current link is a multi-hop link, interference generated by the serving station is less than a threshold, a first interference of a relay link is less than a second interference of an access link, and the serving station comprises a RS, reallocating a BS-RS link resource, and for determining a maximum transmittable power level for P2P communication, wherein the P2P controller further performs P2P communication using the allocated resource.

9. The apparatus of claim 8, wherein, if the current link is not a multi-hop link, the P2P resource selector determines a received signal strength by using a preamble of a Base Station (BS) and selects an uplink resource as the P2P resource.

10. The apparatus of claim 8, wherein the serving station comprises at least one of the BS and the RS, and can be determined based on the received signal strength.

11. The apparatus of claim 8, wherein the relay link resource information comprises at least one of a relay link resource location and an indicator indicating whether the current link is a multi-hop link.

12. The apparatus of claim 8, further comprising a signal strength measurer for determining received signal strengths of an RS and a BS in order to determine the serving station.

13. The apparatus of claim 12, wherein the received signal strengths of the RS and the BS are determined based on a signal strength of a unique signal respectively corresponding to the RS and the BS.

14. The apparatus of claim 13, wherein the unique signal comprises at least one of a preamble signal, a sounding signal and a reference signal of the RS.

15. The method of claim 1, further comprising:
if interference generated by the serving station is greater than a threshold, allocating a P2P-dedicated resource.

16. The method of claim 1, further comprising:
if the current link is not a multi-hop link and interference generated by the serving station is less than a threshold, allocating an uplink resource as the P2P resource.

17. The apparatus of claim 8, wherein the P2P resource selector, if interference generated by the serving station is greater than a threshold, allocates a P2P-dedicated resource.

18. The apparatus of claim 8, wherein the P2P resource selector, if the current link is not a multi-hop link and interference generated by the serving station is less than a threshold, allocates an uplink resource as the P2P resource.

19. A method of allocating a Peer-to-Peer (P2P) resource in a relay-based wireless communication system, the method comprising:
receiving relay link resource information;
determining, based on the relay link resource information, whether a current link is a multi-hop link;
if the current link is a multi-hop link, determining whether a first interference of a relay link is less than a second interference of an access link;
if a first interference of a relay link is less than a second interference an access link, determining whether a serving station comprises a Base Station (BS) or a Relay Station (RS);
if the serving station comprises a BS, reallocating a RS-BS link resource, and if the serving station comprises a RS, reallocating a BS-RS link resource;
determining a maximum transmittable power level for P2P communication; and
performing P2P communication using the allocated resource.

20. The method of claim 19, further comprising:
if a first interference of a relay link is greater than a second interference an access link, allocating an uplink resource as the P2P resource.

21. The method of claim 19, further comprising:
if the current link is not a multi-hop link, allocating an uplink resource as the P2P resource.

* * * * *